United States Patent [19]

Voegeli et al.

[11] Patent Number: 5,561,896
[45] Date of Patent: Oct. 8, 1996

[54] METHOD OF FABRICATING MAGNETORESISTIVE TRANSDUCER

[76] Inventors: Otto Voegeli, 13465 Sycamore Dr., Morgan Hill, Calif. 95037; George Tzanavaras, 2674 Park Wilshire Dr., San Jose, Calif. 95124

[21] Appl. No.: 402,746

[22] Filed: Mar. 13, 1995

Related U.S. Application Data

[62] Division of Ser. No. 152,731, Nov. 15, 1993, Pat. No. 5,479,308.

[51] Int. Cl.⁶ .................................................. G11B 5/42
[52] U.S. Cl. ........................... 29/603.08; 29/603.14
[58] Field of Search .................... 29/603, 603.08, 29/603.14, 603.13; 360/113

[56] References Cited

U.S. PATENT DOCUMENTS

| | | | |
|---|---|---|---|
| 3,887,944 | 6/1975 | Bajorek et al. | 360/113 |
| 4,103,315 | 7/1978 | Hempstead et al. | 360/110 |
| 4,589,041 | 5/1986 | Voegeli | 360/113 |
| 4,639,806 | 1/1987 | Kira et al. | 360/113 |
| 4,649,447 | 3/1987 | Huang et al. | 360/113 |
| 4,663,685 | 5/1987 | Tsang | 360/113 |
| 4,713,708 | 12/1987 | Krounbi et al. | 360/113 |
| 4,771,349 | 9/1988 | Tsang | 360/113 |
| 4,809,109 | 2/1989 | Howard et al. | 360/113 |
| 5,005,096 | 4/1991 | Krounbi et al. | 360/113 |
| 5,018,037 | 5/1991 | Krounbi et al. | 360/113 |
| 5,262,914 | 11/1993 | Chen et al. | 360/113 |
| 5,289,628 | 3/1994 | Omata et al. | 29/603 |
| 5,344,669 | 9/1994 | Chen et al. | 427/130 |
| 5,373,238 | 12/1994 | McGuire et al. | 29/603 X |

OTHER PUBLICATIONS

Ching Tsang, "Magnetics of Small Magnetoresistive Sensors (Invited)", J. Appl. Phys. 55(6), 15 Mar. 1984, 1984 American Institute of Physics, pp. 2260–2231.

M. Kitada, "Reactions and Magnetic Properties of Ti Permalloy Bilayer Thin Films", Thin Solid Films, 131 (1985)21–29, Electronics and Optics.

Masahiro Kitada et al., "Interdiffusion of NB Permalloy Bilayer Thin Films and Its Applications to Magnetoresistive Heads", Journal of Magnetism and Magnetic Materials 98(1991)215–220, North–Holland.

*Primary Examiner*—Carl E. Hall
*Attorney, Agent, or Firm*—Skjerven, Morrill, MacPherson, Franklin & Friel; David E. Steuber

[57] ABSTRACT

A magnetoresistive transducer has a sensor which includes a magnetic layer and an interdiffusion layer. An active central region of the sensor extends between two passive end regions which are used to magnetically bias the active central region longitudinally. The biasing function is attained by fabricating the transducer on a wafer in an H-configuration, with the crossbar of the H as the active central region and a portion of the side legs as the passive end regions. When short current pulses are passed through the side legs of the H, the associated heating of the side legs (but not the crossbar of the H) causes interdiffusion between the interdiffusion layer and the magnetic layer and transforms the magnetic layer from soft magnetism to hard magnetism as required for the biasing function. The wafer is diced near the crossbar of the H and then processed further to form the finished transducer.

19 Claims, 4 Drawing Sheets

METHOD OF FABRICATING MAGNETORESISTIVE TRANSDUCER

This application is a divisional of application Ser. No. 08/152,731, filed Nov. 15, 1993, now U.S. Pat. No. 5,479,308.

FIELD OF THE INVENTION

The present invention pertains to the field of magnetoresistive sensors for reading data in a magnetic recording device. More particularly, the present invention pertains to applying a selective pulse interdiffusion process for biasing the magnetoresistive sensors.

BACKGROUND OF THE INVENTION

In the field of magnetic recording devices, data such as computer programs, databases, spreadsheets, e.g. are usually stored onto a magnetic medium as a series of binary bits. Typically, the magnetic medium takes the form of a circular disk which is rotated about a spindle. A transducer, also known as a "head", is used to write bits of data onto the spinning circular disk. Sometimes the same head is also used to read the bits of data off the spinning disk. In other instances, a separate head is used in the reading process in order to realize greater areal density for storage.

One such type of heads used only for reading data, is referred to as a Magnetoresistive Sensor (MR Sensor). MR sensors comprise a segment of soft-magnetic material whose electrical resistance varies when subjected to a varying magnetic field. This effect is used in Magnetoresistive Recording Heads (MR Heads) to sense the information recorded along tracks of a magnetic recording medium.

Figure 1:
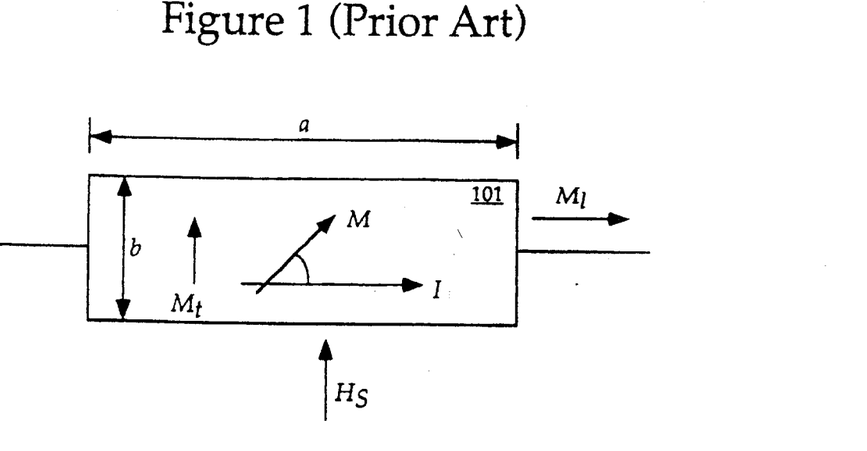
FIG. 1 illustrates the principle of operation of a prior art MR sensor whose active part comprises a rectangular piece of magnetoresistive material with a longitudinal axis parallel to the recording medium.

FIG. 1 illustrates the principle of operation of an MR sensor whose active part comprises a rectangular piece of magnetoresistive material 101 with a longitudinal axis, "a", parallel to the recording medium and a transverse axis, "b", which is perpendicular to the recording medium. A sense current, "I", flows along the longitudinal axis of the sensor having a resistance $R_0$. The electrical voltage across the sensor varies in a well known fashion with the orientation, θ, of its magnetization, M, as $V=I \cdot R_0 (1+c_{mr}) \cos^2 θ$, where $c_{mr}$ is the magnetoresistive coefficient of the sensor material and θ is the angle between the current, I, and the magnetization, M. Magnetic fields, $H_S$, from the recording medium produce variations of θ that are linear relative to, $H_S$, when the quiescent orientation of the magnetization, $θ_0$ is roughly at a 45° angle relative to the current. This is achieved by injecting suitable amounts of magnetic biasing flux into the sensing segment, such as to provide for flux continuity along both axis.

This necessitates a biasing flux $M_t=M \sin θ_0$ along the transverse axis and a biasing flux $M_1=M \cos θ_0$ along the longitudinal axis. Hence, a complete sensor embodiment includes transverse and longitudinal biasing means in addition to the sensing segment. The need for transverse biasing provisions has been recognized early, and several biasing schemes have been disclosed in the prior art. They typically employ a laminate of magnetic and nonmagnetic films such that the sensing current, I, generates a transverse magnetic biasing flux within the magnetic laminate circuit.

Figures 2A, 2B:
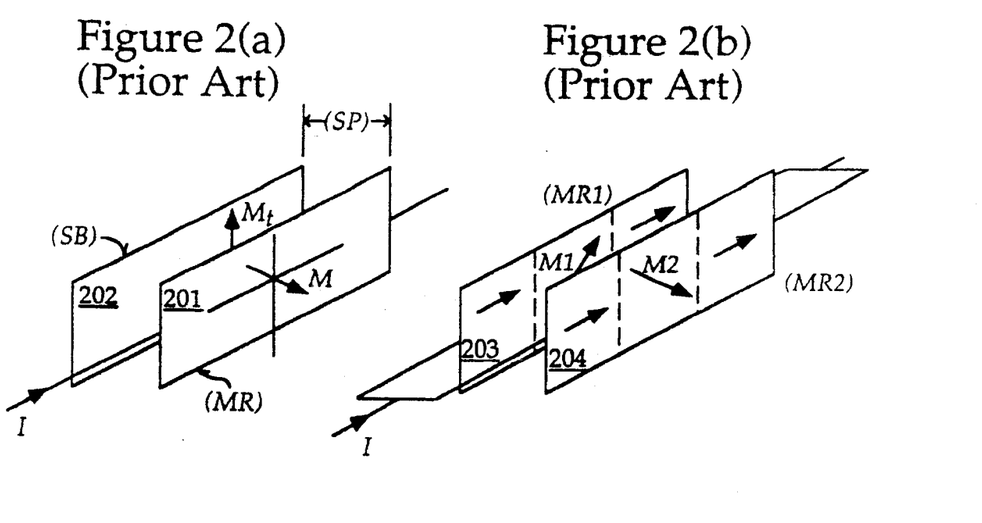
FIG. 2(a) shows a prior art Soft-Film Biasing scheme comprising an MR film segment and a Soft-Film Biasing segment in a plane-parallel position with each other.
FIG. 2(b) shows a prior art mutual biasing scheme employing two identical MR films in a plane-parallel position.

For instance, the well known Soft-Film Biasing scheme shown in FIG. 2(a) comprises an MR film segment (MR) 201 and a Soft-Film Biasing segment (SB) 202 in a plane-parallel position with each other. The two films are separated by a Spacer segment (SP). The spacer may be quite thin (e.g., 200 A), as it only serves to break the magnetic "exchange coupling" between the MR 201 and the SB 202 film. The sense current, I, flowing through the less resistive (MR) segment 201 saturates the (SB) segment 202 of the appropriate thickness in a perpendicular direction to produce the required biasing flux, $M_t$.

Mutual biasing schemes like the one shown in FIG. 2(b), employ two identical MR films (MR1) 203 and (MR2) 204 in a plane-parallel position. Here, the sense current is equally divided between the two films 203–204 such that the films mutually bias each other, with the magnetization M1 and M2 rotated in opposite directions. This embodiment is designed to operate in a differential mode with the output signal proportional to the difference in field seen by the two MR segments.

The main difference between the single MR element device of FIG. 2(a) and the dual element device of FIG. 2(b) is that the spatial resolution capability of the former relies on the presence of two magnetic shields (not shown) enclosing the sensor and is governed by the spacing between the two shields. In contrast, the spatial resolution capability of the differential device is inherent and governed by the spacing between the two MR elements.

These and other transverse biasing schemes are well known and practiced in the prior art. The need for longitudinal biasing had also been recognized, but its practical realization proved to be more difficult. This is because in contrast to transverse biasing, one cannot readily utilize the sense current to activate a longitudinal biasing circuit. Consequently, the disclosed longitudinal biasing schemes employ some type of permanent magnet configuration in thin film form for longitudinal biasing. These embodiments require elaborate fabrication steps and are afflicted with a variety of problems and limitations.

For example, U.S. Pat. No. 4,639,806 issued to Kira and U.S. Pat. No. 4,663,685 issued to Tsang, recognized the need for having longitudinal biasing means attached to the MR sensing segment. Kira and Tsang constructed such means in similar fashion, namely by superpositioning a hard-magnetic film onto the end regions of the MR sensor. These end-segments then become inactive because of the presence of the hard-magnetic film and because of the presence of an additional conducting film over the same area. The two inventions differ in that Kira's hard magnetic film is ferromagnetic whereas Tsang's hard-magnetic film is antiferromagnetic (producing no external magnetic flux). In both cases, these longitudinal biasing means accomplish the "freeze" of the magnetization within these end-regions.

In an additional process step, a large external magnetic field is used to magnetize the end-segments along the longitudinal direction and thereby create longitudinal biasing flux. In Tsang's invention, the biasing flux equals the magnetization of the MR film. Kira's method injects an additional amount of flux that equals the magnetization of his ferromagnetic biasing film. Having too much biasing flux is undesirable as it renders the sensitivity within the sensor segment non-uniform, quenching it toward the attached end-segments. Some adjustment is possible, however, by magnetizing the end-segments at some canted angle relative to the longitudinal direction.

The main problem with both inventions is that their longitudinal biasing means do not control the magnetization within the soft-magnetic biasing film. This causes unstable operation and pick-up of extraneous magnetic signals from the end-regions. These prior art embodiments are also quite nonplanar, which produces a loss of spatial resolution capability.

These flaws are corrected in U.S. Pat. No. 4,713,708 by controlling the magnetization of both the MR film and the SB film underneath the end-regions. This is achieved at the expense of added fabrication complexity. Additionally, there is the problem of accurate alignment between the different layers and the preclusion of in-situ deposition.

U.S. Pat. No. 4,771,349 seeks to allow for in-situ deposition of all films comprising the sensing segment. This is achieved by subsequently removing, under the end-regions, the SB and SP layers and then superpositioning the longitudinal biasing means over the underlying MR layer only. The main problem with this approach is fabrication complexity and the creation of partial heterogeneous junctions within the current path.

The objective of U.S. Pat. No. 5,018,037 is to simplify fabrication requirements by constructing contiguous sensing and biasing segments without any layer in-common. A problem with this invention is the creation of a heterogeneous junction in the current path.

U.S. Pat. No. 5,005,096 utilizes a hard-magnetic film to cause "magnetostatic biasing" of the MR sensing configuration. There is no physical contact and hence no magnetic exchange coupling active between the hard-magnetic film and any magnetic part of the MR sensor. Instead, the biasing flux is injected at the boundary between sensing and end regions as defined by a superpositioned conducting layer. The disadvantage of this invention is that magnetostatic control does not render the end-segments totally inactive. Thereby, substantial pick-up of extraneous magnetic signals occurs from the end-regions.

U.S. Pat. No. 4,589,041 describes a differential sensor which uses a pair of plane-parallel MR segments that mutually bias each other in the transverse direction as is shown in FIG. 2(b). Such a design is of particular interest as it offers substantially unlimited spatial resolution capability without the use of magnetic shields. However, the teachings of this invention do not include associated longitudinal biasing provisions and no prior art biasing scheme is readily applicable to a differential sensor design.

Thus, there is a need in the prior art for improvements in the longitudinal biasing provisions and there are no known biasing schemes that satisfy the requirements of differential sensor embodiments. The needed improvements relate to the simplicity of fabrication, the sensors-spatial resolution capability and its long-term reliability. It is the objective of this invention to provide these improvements.

SUMMARY OF THE INVENTION

In the "Selective Pulse Interdiffusion" (SPI) process, the areas destined to become biasing segments of an MR Head are selectively heated such that some specific layers of the sensor laminate interdiffuse to produce a magnetic layer that has permanent magnet characteristics. Heating is done with one or more electrical current pulses whose duration is short enough as to spatially confine heating to the biasing segment. In one embodiment, a ladder-arrangement of sensors on the wafer allows the SPI process to be performed collectively on a plurality of sensors simultaneously.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A selective pulse interdiffusion process for MR sensors is described. In the following description, for the purposes of explanation, numerous specific details such as currents, durations, fabrication steps, biasing techniques, etc., are set forth in order to provide a thorough understanding of the present invention. It will be apparent, however, to one skilled in the art that the present invention may be practiced without these specific details. In other instances, well-known structures and devices are shown in schematic form in order to avoid unnecessarily obscuring the present invention.

The present invention is directed to an improved longitudinal biasing method that may be used with all the different sensor configurations. In order to understand these improvements, one needs to be aware of several sensor fabrication and functional requirements described below.

The longitudinal biasing provisions should not adversely affect the sensitivity and uniformity of response characteristics of the sensor segment, either by degrading its intrinsic response characteristics or by providing a mismatched amount of biasing flux. The optimal amount of injected flux equals the longitudinal flux component of the sensor segment in combination with the transverse biasing provisions.

In order to have a sensor embodiment having high spatial resolution capability, the sensor should be thin and planar. Also, the longitudinal biasing provisions may not contain soft-magnetic elements which would otherwise channel extraneous magnetic flux-signals into the sensing segment.

Given that the output signal is proportional to the sense current amplitude, it is very desirable that there be no junction of heterogeneous materials in the current path that would limit the current amplitude due to electromigration and/or galvanic corrosion effects. Furthermore, since the individual layers comprising the active sensor segment are very thin, their electrical and magnetic properties are much affected by surface characteristics. Good reproducibility of operating characteristics can hence be obtained only if the sensor configuration is fabricated with all layers vacuum-deposited sequentially without intermitted exposure to a non-vacuum environment.

Moreover, the longitudinal biasing method should not be limited to a specific sensor embodiment, but instead, should be applicable to a variety of different designs, including the ones using a pair of MR sensors in differential sensing schemes. In addition to the above, there are the obvious requirements that the fabrication of the sensor embodiment be least complex such as to reduce manufacturing cost and provide a high fabrication yield.

One key advantage of the SPI process is to produce hard-magnetic biasing segments from the same laminate that comprises the sensing segment. This allows one to deposit the complete sensor assembly in-situ without intermitted exposure to non-vacuum conditions. Furthermore, this yields a configuration having no heterogeneous junction in the path of the sense current between the sensing and the biasing segments.

In the present invention, the different magnetic response characteristics of the sensing and the biasing segments are therefore established not by means of using different materials and fabrication processes, as has been done-in the prior art, but instead by means of a subsequent conversion process on the regions destined to provide the biasing function. This conversion is accomplished by heating the sensor laminate within the biasing region for a certain time period above a critical conversion temperature. The heating causes an inter-diffusion of constituents between certain layers of the sensor laminate.

Figure 3A:
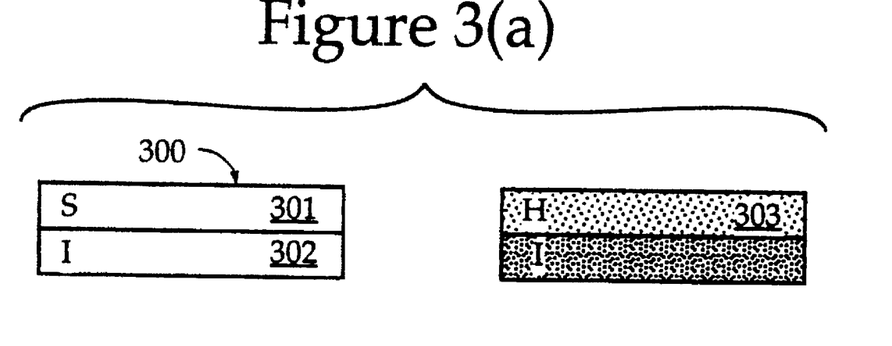
FIG. 3(a) shows an MR sensor having a hard-magnetic layer as formed by the selective pulse interdiffusion process.

Consequently, the present invention employs at least one pair of layers made of different materials. These layers are deposited in intimate contact with each other. FIG. 3(a) shows, on the left-hand side, a cross section through an MR sensor 300 comprising: a soft-magnetic layer (S) 301 and an interdiffusion layer (I) 302. When heated above the conversion temperature, the two layers interact such that the magnetic characteristics of the S-layer 301 are transformed from soft-magnetic, having a coercive force of approximately less than 1 Oersted, to hard-magnetic (H), having a coercive force of say more than Oersted. The transformed areas can thus provide the longitudinal biasing segments for the MR sensor. A cross section through a transformed area is shown on the right side of FIG. 3(a). It contains the hard-magnetic layer (H) 303 which performs the longitudinal biasing function.

The transformation from a soft-magnetic film (S) to a hard-magnetic film (H) results from an interdiffusion of some constituents to the two films, a process that is aided by the thinness of the layers. The change in magnetic properties of the soft magnetic layer can be quite dramatic for certain choices of materials, even though the amount of interdiffused constituents may be small and does not change the material composition appreciably.

For MR head applications, there are, of course, additional requirements imposed upon the choice of materials, than solely the ability to undergo such a magnetic conversion. The S-layer is typically an active component of the MR sensor configuration (i.e., either the MR sensor itself or a component of the transverse biasing provision). The traditional choice for this layer has been "Permalloy", either in its pure or doped form, depending whether or not a magnetoresistive response is required. Other soft-magnetic materials may also be usable and are within the scope of this invention. The requirements for the I-layer characteristics places a restriction that its presence does not adversely affect the response characteristics of the S-layer in the sensing region, but after exposure above the conversion temperature, it interacts with the S-layer to produce a substantial increase of the coercivity in the latter.

Figure 3B:
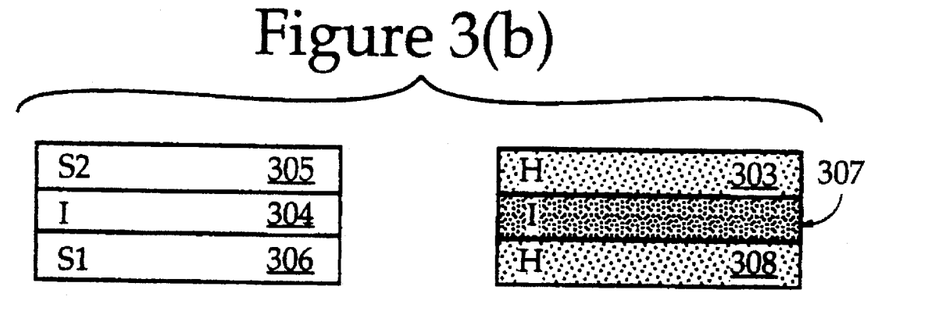
FIG. 3(b) shows an MR sensor formed from an interdiffusion layer sandwiched between two soft-magnetic layers.

Ideally, the I-layer is an inherently required component within the sensing region as with the laminate structure shown on the left in FIG. 3(b). In other words, the I-layer 304 is interposed between the S2 layer 305 and the S1 layer 306. By analogy, the I-film is the spacer (SP) between the (MR) film and the (SB) film of FIG. 2(a). After having been heated above the conversion temperature, both the (MR) film and the (SB) film attain hard-magnetic characteristics. This is depicted on the right of FIG. 3(b) as the two H-layers 307 and 308.

Figure 3C:
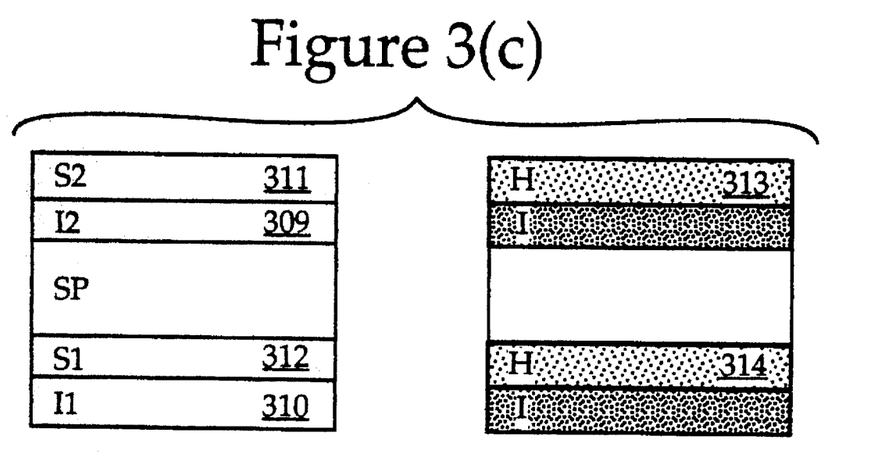
FIG. 3(c) shows a differential MR sensor formed from the SPI process.

The laminate structure shown in FIG. 3(c) is representative of the differential MR sensor shown in FIG. 2(b). Here, the I-films 309 and 3 10 serve as the adhesion-layers for the S1 and S2 films 311 and 312 (i.e., MR1 and MR2). Both of these layers 312–313 attain hard-magnetic characteristics after the conversion process. As these examples suggest, the longitudinal biasing scheme of the present invention can be used with any of the different disclosed MR sensor designs and without adding additional layers to the fabrication of the sensing region.

Potential choices for the I-layer may be gained from the published results of many investigations related to the choices of materials in the construction of transverse biasing embodiments. Some investigations include the choice of materials to be used as underlayer to the S-layer for the sake of promoting adhesion to the substrate. Other investigations include the choice of materials to be used as spacer layers for breaking the exchange coupling between two soft-magnetic films within the transversely biased sensing region. Investigators have also studied the effects of raised temperatures on the material characteristic in such laminates in order to ascertain that no detrimental changes would occur due to temperature elevations associated with certain wafer processing steps. This work served to reject choices of materials that did incur symptoms of temperature induced changes.

Guidance to the selection of suitable materials for this invention can be gained from these works, except that the interest is rather opposite. Namely, the interest is in materials that do change their characteristics after exposure to elevated temperature (provided that the changes occur only at temperatures well above the highest wafer processing temperature). Suitable choices for the I-layer can be found within the family of refractory and certain transition metals. Several such metals can satisfy the requirements in that they do not, without exposure above about 180° C., degrade the soft-magnetic characteristics of the S-layer but do provide the hard magnetic characteristics to this layer after having been exposed to temperatures approximately above 300° C. Examples of suitable choices of materials for the I-layer are: Titanium (Ti), Tantalum (Ta), Chromium (Cr) and possibly others from the family of refractory and transition metals. There may also be suitable material choices other than refractory and transition metals that satisfy the requirements of this invention.

After selecting the proper materials, there still remains the step of accomplishing heating within precisely defined boundaries (to an accuracy of better than 1 um) in order to achieve the proper interdiffusion. The difficulty is that lateral spreading of heat may cause an ill-defined conversion boundary. This problem is solved in the present invention by heating the conversion areas over a time-period that is short enough such as not to allow excessive lateral spreading of heat. Calculations and experiments have shown this is possible ff the heating time is less than approximately one micro second. This makes it necessary to reach the conversion temperature within an even shorter time period, approximately one-tenth of a micro-second.

Such rapid heating requires the application of power densities in the order of Megawatts per square centimeter over the conversion area. This can be accomplished by galvanic heating by using an electrical current flowing through the conversion region. Because the cross section of the laminate is quite small, conventional pulse generators can readily supply the required pulse-currents with sufficient amplitude and shortness of duration. After a pulse has been applied, the area cools rapidly with the heat flowing into the wafer substrate. A plurality of such heating cycles may be used to complete the conversion process. With a typical cooling time that is about ten times longer than the pulse length, the SPI process takes about ten times longer to complete (as if the material had been kept continuously at the conversion temperature).

Once selected regions of the sensor configuration have been convened from the soft-magnetic sensing structure into a hard-magnetic biasing structure, there remains the step of defining a path for the SPI current, such that the current flows only through the conversion segment but not through the sensing segment. The conventional MR sensor is electrically a two-terminal device with the sensing current flowing through both the biasing and sensing regions. Any such flow-pattern would not be usable for the SPI process, as it would affect the sensing and biasing regions similarly.

Figure 4A:
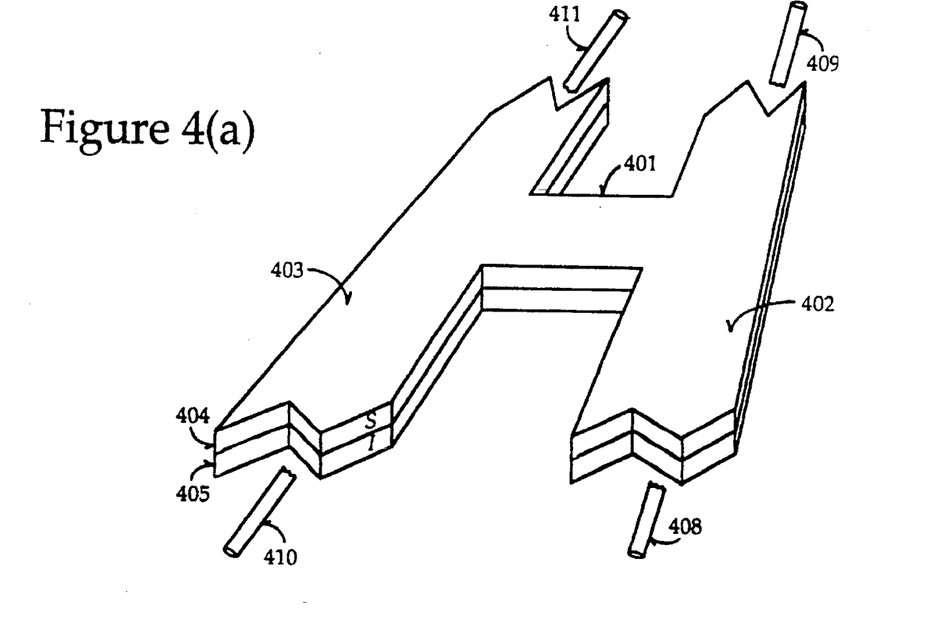
FIG. 4(a) shows a sensor geometry that electrically is a four-terminal device in an H-configuration of a wafer.
Figure 4B:
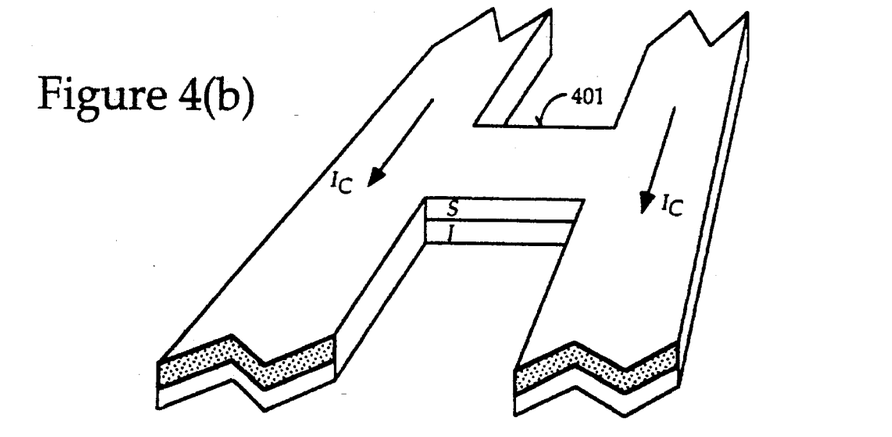
FIG. 4(b) shows an H-shaped sensor configuration with the conversion current flowing through both legs for conversion into hard-magnetic biasing segments.
Figure 4C:
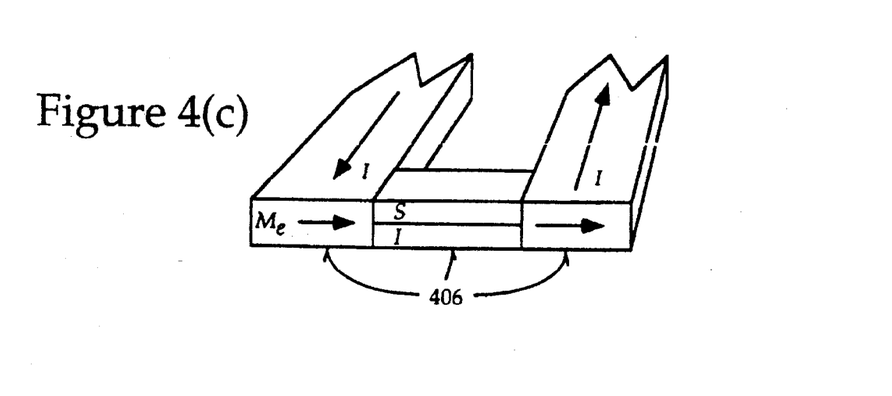
FIG. 4(c) shows the sensor configuration after fabrication of the MR head has been completed.

To perform the SPI process, one needs to pattern the deposited laminate at each sensor location into an H-configuration as is shown in FIGS. 4(a)–(c). This geometry represents electrically a four terminal configuration as is shown in FIG. 4(a) having terminal points 408 and 409 at the ends of leg 402 and terminal points 410 and 411 on the ends of leg 403. The cross-bar 401 of the "H" is to remain the soft-magnetic sensing laminate while the two vertical bars 402 and 403 of the "H" are to be converted into the hard-magnetic biasing laminate. The conversion is performed as is depicted in FIG. 4(b) by sending the SPI current, $I_C$, flowing through the legs of the "H", thereby converting these regions into a hard-magnetic laminate. The legs may be converted one at a time by first sending the SPI current from terminal 408 to terminal 409 and subsequently from terminal 410 to terminal 411. Alternatively, both legs may be converted at the same time simultaneously sending the SPI current from the terminals 408 and 4 10 to the terminals 409 and 411. In either case, none of the SPI current flows through the cross-bar 401. In the first case, because there is no electrical connection through the other leg and in the second case, because of symmetry, there is no difference in electrical potential across the cross-bar.

FIG. 4(c) shows the sensor configuration after the fabrication of the MR head has been completed. It can be seen that the lower portion of the H-configuration has been removed by lapping as performed in the course of the conventional sequence of head fabrication steps with the face 406 now being planar with the head's air bearing surface. Note that the configuration has become the standard 2-terminal MR sensing device with the sense current, I, applied as indicated.

Figure 5A:
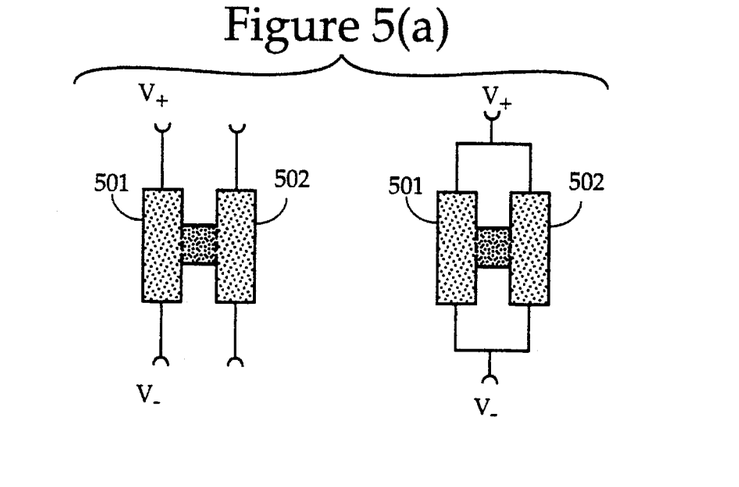
FIG. 5(a) shows the SPI conversion process as applied to a single element.
Figure 5B:
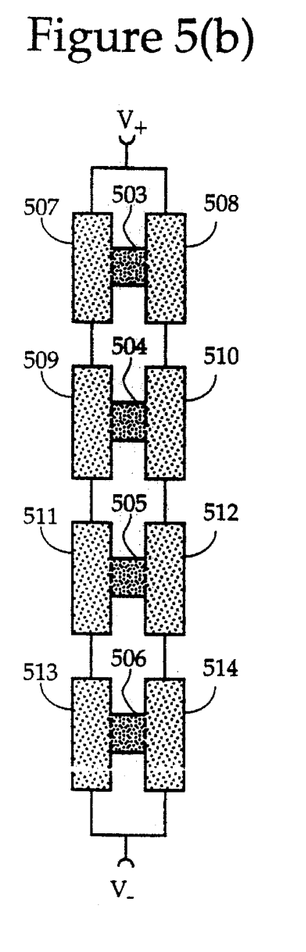
FIG. 5(b) shows the SPI conversion process as applied to a column of H-shaped elements.
Figure 5C:
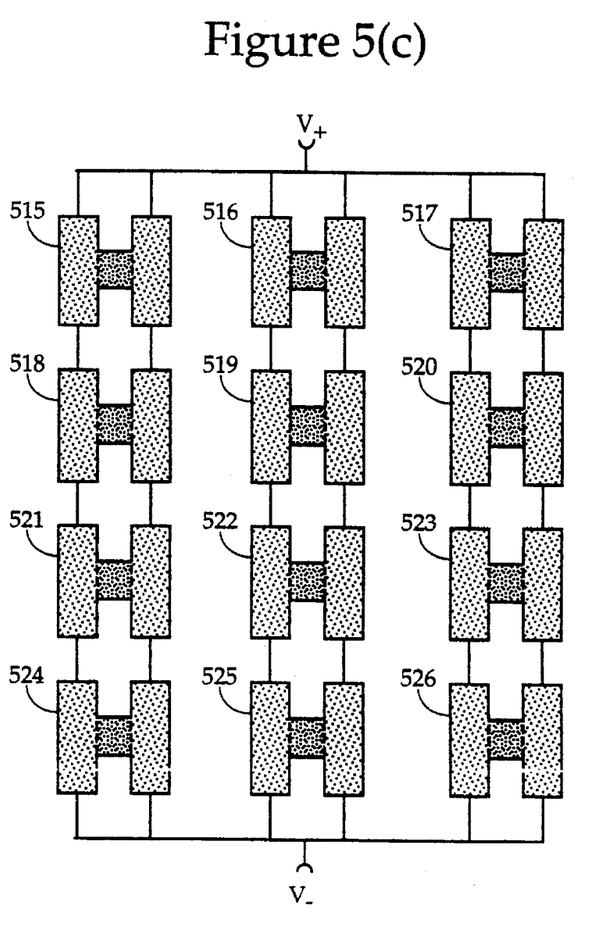
FIG. 5(c) shows a method for interconnecting such H-configurations such as to perform the conversion procedure simultaneously on a plurality of MR sensors simultaneously on the wafer.

Furthermore, several such H configurations can be electrically interconnected, as is shown in FIGS. 5(a)–(c), to allow simultaneous conversion on a plurality of H-configurations on the wafer. The interconnections may be made of the sensor laminate itself, or, preferably of a superpositioned lead metallurgy as is also being used for connecting the MR sensor to its external terminal connections. Again, the SPI interconnections between sensor elements are subsequently removed when the wafer is being diced and lapped into individual sliders during the conventional sequence of head fabrication steps. The remaining parts on the slider are the required external terminal connection.

The conversion procedure is depicted as illustrated in FIG. 5(a) for a single element with the voltage difference V+/V− applied one or both of the legs 501 and 502 as discussed above. FIG. 5(b) shows a column of H-elements interconnected into the form of a ladder whose rungs 503–506 are to become the sensing regions and the rails 507–514 are destined to become biasing regions of the MR configuration. Note that the whole ladder of H-elements form the required four-terminal device. In contrast to the single element process, the SPI conversion procedure on a conversion ladder needs to be carried out with the SPI current flowing simultaneously through both legs in order that there be no voltage difference across the rungs of the ladder. A conversion ladder may include all H-elements within a column on the wafer or it may include only a portion of a column. Also, a plurality of such ladders may be connected in parallel as is shown in FIG. 5(c). Given enough available pulse current, the conversion procedure may be carried out simultaneously on all H-elements 515–526 on the wafer.

The SPI invention can be used with a variety of MR sensor configurations. Schemes using different transverse biasing methods, for instance, differ in the detailed structure of the laminate comprising the sensor region. As long as this laminate is assembled with an interdiffusion film in contact with each soft-magnetic film, the SPI method can convert any chosen region of the laminate into a hard-magnetic biasing region. In short, the present invention provides a longitudinal biasing method that is broadly applicable to sensor embodiments using different transverse biasing schemes in single-ended or differential sensing implementations.

A fabrication process is now described for a differential type MR sensor. In this embodiment, fabrication starts with sequentially vacuum-depositing the laminate of continuous thin metallic films onto a suitable substrate. The substrate typically is a ceramic material suitable to lastly be cut and shaped by well known fabrication steps into a plurality of sliders. The laminate for this differential configuration comprises the five films: I1, S1, SP, S2, I2 (as shown in FIG. 3(c), with an optional protective passivation film, such as Alumina (not shown) on top of I2. The structure may be altered to the sequence S1, I1, SP, I2, S2 or I1, S1, SP, I2, S2 without substantially changing sensor function or the conversion process.

The Interdiffusion Films, I1 and I2 are on average 150 A thick (i.e., 30 to 300 A) and made of Titanium (Ti) or a similar refractory metal. The Sensor Films, S1 and S2, are on average 400 A (i.e., 200 to 800 A) thick and are made of Permalloy or another soft-magnetic material that exhibits a suitably large magnetoresistive effect. The Spacer Layer, SP, has a thickness of approximately 3000 A (i.e., 1000 to 8000 A), such as to space the Sensor films, S1 and S2 by a distance less than the desired spatial resolution capability. Its electrical conductance should be low so as not to shunt the sensor current but it need not insulate S1 from S2 since they will be connected in-parallel. In principle, the spacer layer and the interdiffusion layer could be one and the same (as shown in FIG. 3(b). However, suitable interdiffusion materials tend to produce too much of a shunting conductance. Hence, it is advantageous to employ an insulating material, such as Alumina as a spacer layer (as suggested by FIG. 3(c).

The subsequent processing steps serve to pattern the laminate into H-shapes and to fabricate a lead-metallurgy to establish the required electrical connections. All these steps are done by means of well known photolithographic process steps using subtractive methods, such as ion-milling or additive "lift-off" methods. The geometry of the lead metallurgy has to be such as to enable the simultaneous SPI conversion on a plurality of elements and to provide for the sensor's external terminal connections on the slider. The requirements for both functions are identical: to provide for a low resistance electrical connection to the sensor such as to have a minimum of extraneous power dissipation.

If the sensor laminate is passivated with an insulating layer (e.g., Alumina), one needs to etch via-holes through the passivation wherever one wants to establish an electrical connection between the lead and the laminate metallurgy. Such via-holes can be etched chemically with the metallic laminate serving as an etch-stop. Next the lead metallurgy, made of copper, aluminum, or gold or a similarly well conducting metallic alloy is deposited as a continuous layer onto the passivation layer. It is subsequently patterned into the desired lead configuration using ion-milling for instance. Note that all of the above process steps are essentially identical to the steps required to fabricate the sensor configuration without longitudinal biasing provisions.

Now the assembly is ready for the SPI conversion process. This is done by connecting an electrical pulse generator to the SPI contact pads and sending current pulses through each conversion region. In the currently preferred embodiment, a pulse amplitude of 1 ampere is required to heat 10 um wide conversion segments above the threshold temperature. A pulse length of 0.1 usec at a duty-cycle of about 10% is used to accomplish the SPI conversion with a sufficiently sharp definition of the conversion boundaries. The total time required for the SPI conversion procedure depends on the pulse length, amplitude and duty-cycle. It can range from 0.1 to 1000 seconds, but is typically about 10 seconds. In other embodiments, the conversion segments can range in width from 5 to 50 um. The pulse length can be varied from 0.1 to 1.0 usec with a variance in the duty cycle of 1% to 20%.

Finally, the wafer is diced into individual rectangular shapes, each carrying at least one sensor configuration near the edge which is to become the air-bearing surface (ABS) of the recording head. The ABS edge is lapped in a conventional fashion partly into the sensor stripe to yield the final configuration (as shown in FIG. 4(c). The lapping process removes the lower parts of the H-shapes and connecting lead metallurgy and also effects the final height of the sensor stripe. The upper part of the H-shape and lead metallurgy remains on the slider and comprises the sensor configuration with lead metallurgy of the finished MR recording head.

The last step in the fabrication of an MR sensor configuration is to magnetize the hard-magnetic end regions along a substantially longitudinal direction. This is done by applying an external magnetic field of sufficient magnitude to saturate the biasing region along the specified direction. The end regions may be magnetized at a somewhat skewed angle relative to the longitudinal axis such as to inject an optimal amount of biasing flux into the active region. This initialization procedure can be carried out in unison on all sensors on the wafer. Traditionally it is often performed individually in combination with a head testing procedure on the finished head embodiment. If the embodiment is of the shielded type, then the magnitude of the initialization field must exceed the coercive force of the hard-magnetic region in addition to the file required to saturate the magnetic shields.

This initialization procedure renders all longitudinal biasing regions uniformly magnetized along the same direction. Such biasing provisions are in concert with the active sensing area having a magnetization configuration as is shown in FIG. 2(a) for the single-element and in FIG. 2(b) for the dual element embodiment.

Figure 2C:
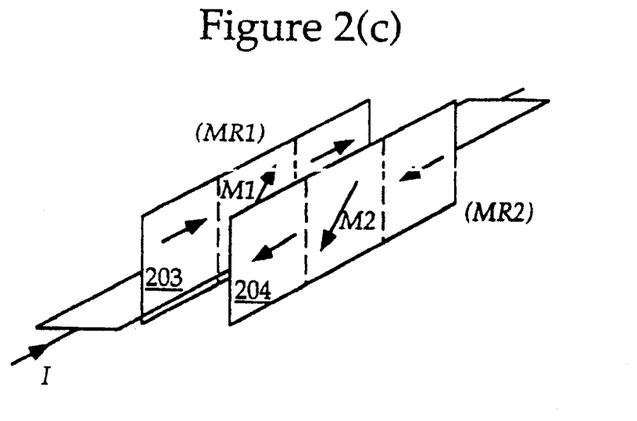
FIG. 2(c) shows a magnetization configuration for a dual element MR sensor.

However, in the case of the dual element sensor, the SPI method permits one to employ a magnetization configuration as is shown in FIG. 2(c) that differs from the prior art configuration shown in FIG. 2(b). In the SPI configuration of FIG. 2(c), the orientation of the magnetization in the two sensor elements is antiparallel with respect to each other. This orientation offers substantial performance advantages over the, FIG. 2(b) orientation. In the antiparallel orientation both films have identical spatial sensitivity characteristics which is not the case for the FIG. 2(b) orientation where the sensitivity of one film is skewed to the right side of the sensor. However, an antiparallel orientation of the magnetization can be internalized and maintained by having a similar antiparallel orientation of the magnetization in the longitudinal biasing segments which injects flux components of opposite polarity into the two MR films of the active segment. The ability to initialize such an antiparallel biasing configuration is a unique feature of the SPI method. It happens because the SPI current flowing through the legs of the H-configurations produces longitudinal magnetic fields that are antiparallel in the superpositioned biasing segments. The resulting antiparallel magnetization in the end-regions force the magnetization in the active region into a similarly antiparallel state. The initialization of the antiparallel magnetization configuration as is shown in FIG. 2(c) is hence an automatic feature of the SPI method that occurs without the application of the traditional external initialization field.

The existence of an antiparallel magnetization configuration in the active and passive sensor areas offers other advantages. Since there is no net-magnetic flux passing through any cross section through the sensor, this configuration inherently offers improved stability of the initialized configuration against external magnetic disturbances.

In an alternative embodiment of the present invention, a conventional single-element MR-sensors relies on the use of magnetic shields for attaining its spatial resolution capability. A suitable laminate employing the Soft-Film Biasing method is depicted in FIG. 3(b) with S1 being the soft-bias film and S2 being the MR film The interdiffusion film, I, also serves the function of the traditional spacer layer, SP, used to break the magnetic exchange coupling between S1 and S2. The fabrication of this other embodiment differs in that it requires one to first fabricate a magnetic shield (typically about 1 um thick Permalloy) and a superpositioned spacer/insulation layer on the substrate. Similarly, the fabrication process is concluded with the additional steps of depositing a second spacer/insulation layer and a second magnetic shield on top of the sensor configuration. The magnitude of the initialization field must be large enough such as to saturate the shields and then exceed the coercive force of the hard-magnetic biasing regions.

Note that in the present invention, the sensing and biasing provisions of the entire MR sensor configuration are fabricated from the same laminate. The laminate may be deposited in-situ without intermitted exposure to non-vacuum conditions. Furthermore, the SPI process optimizes the reliability of operating the MR sensor because the configuration has no heterogeneous material-junctions along the current path. In addition, the present invention provides a sensor configuration that can provide optimal spatial resolution capability since the longitudinal biasing segment is perfectly planar with the sensing segment and does not contain any soft-magnetic elements.

Thus, a selective pulse interdiffusion process for magnetoresistive sensors is disclosed.

What is claimed is:

1. A method of fabricating magnetoresistive transducers, comprising the steps of:

depositing a first thin film of a first material onto a substrate;

depositing a second thin film of a second material onto the first film, wherein the first thin film and the second thin film form a soft-magnetic magnetoresistively active laminate having an electrical resistance that varies in response to an externally applied magnetic field;

delineating the laminate into a substantially H-shape having two substantially vertical leg regions connected by a substantially horizontal cross-bar that provides for a four terminal electrical configuration with terminal points at each end of said vertical leg regions;

applying an electrical potential from the upper terminals of the vertical leg regions to the lower terminals of the vertical leg regions such that an electrical conversion current passes through each leg region but substantially no current passes through the cross-bar between said vertical leg regions, wherein an amplitude of said conversion current heats the vertical leg regions above an activation temperature so as to cause an interdiffusion of at least one constituent from one film of the laminate into another film of the laminate and wherein said interdiffusion causes a conversion in the magnetic properties of the laminate in the leg regions from soft-magnetic to hard-magnetic such that a portion of said leg regions can be utilized to provide longitudinal biasing of the magnetoresistive transducer.

2. The method of claim 1, wherein the interdiffusion in the leg-regions is performed simultaneously on a plurality of shapes by electrically connecting the terminal points of different H-shaped elements such that the conversion current flows simultaneously through the leg regions on a plurality of H-shaped elements.

3. The method of claim 1 further comprising the step of removing a lower portion of the H-shape up to between a lower edge of the cross-bar and an upper edge of the cross-bar to create a two terminal electrical configuration with said Upper terminals of said vertical leg regions remaining.

4. The method of claim 3 further comprising the step of applying an electrical potential between said upper terminals such that an electrical magnetoresistive sense current flows from a portion of a first one of said leg regions through the crossbar into a portion of a second one of said leg regions.

5. The method of claim 1, wherein the current is applied as a current pulse whose amplitude heats the leg region above the activation temperature and whose duration is short enough such that the heating does not spread substantially into the cross-bar.

6. The method of claim 1, wherein the current is applied as a plurality of sequential current pulses where the time between current pulses is long enough for the leg region to cool substantially below the activation temperature.

7. The method of claim 1, wherein a current is applied through the leg regions of said H shape whose amplitude and duration is such as to produce an antiparallel magnetization.

8. The method of claim 1, further comprising the step of using external means to apply a magnetic field of sufficient magnitude substantially along the horizontal direction such as to permanently magnetize the hard-magnetic leg regions and to provide longitudinal biasing of the cross-bar.

9. The method of claim 5 wherein the duration of the current pulse is less than approximately one micro second.

10. The method of claim 9 wherein an interval between a beginning of the current pulse and time at which the leg region reaches the activation temperature is less than approximately one-tenth of a micro second.

11. The method of claim 2 wherein the plurality of H-shapes are formed into a ladder arrangement.

12. The method of claim 2 wherein the plurality of H-shapes are formed into an arrangement of parallel ladders.

13. The method of claim 1 wherein the first material includes a member of the group consisting of titanium, tantalum, chromium and the refractory and transition metals.

14. The method of claim 1 wherein the second material includes a nickel-iron alloy.

15. The method of claim 1 wherein the first thin film is deposited on a first surface of the substrate, the method further comprising the steps of depositing a third thin film of the second material onto a second surface of the substrate and depositing a fourth thin film of the first material onto the third thin film.

16. A method of fabricating a magnetoresistive transducer comprising the steps of:

providing a first layer of a soft-magnetic material;

depositing on the first layer a second interdiffusion layer, the first and second layers together forming a sensor laminate, the laminate including a sensor region and a biasing region located adjacent the sensor region;

heating the biasing region of the laminate to a conversion temperature so as to convert the first layer to a hard magnetic material in the biasing region while leaving the first layer as a soft-magnetic material in the sensor region.

17. The method of claim 16 wherein the conversion of the first layer to a hard magnetic material results from an interdiffusion of constituents of the first and second layers in the biasing region.

18. The method of claim 16 wherein the step of heating comprises causing an electric current to flow through the biasing region.

19. The method of claim 18 wherein the biasing region and the sensor region are configured such that substantially no current flows through the sensor region during the step of heating.

* * * * *